United States Patent [19]

Schröeder

[11] 4,187,353

[45] Feb. 5, 1980

[54] FOAMABLE POLYMER MATERIAL

[75] Inventor: Günter Schröeder, Ober-Ramstadt, Fed. Rep. of Germany

[73] Assignee: Rohm GmbH, Darmstadt, Fed. Rep. of Germany

[21] Appl. No.: 912,962

[22] Filed: Jun. 6, 1978

[30] Foreign Application Priority Data

Jun. 10, 1977 [DE] Fed. Rep. of Germany ....... 2726260

[51] Int. Cl.$^2$ ............................ C08V 9/12; C08V 9/14
[52] U.S. Cl. ................................ 521/149; 526/240; 521/149; 526/241
[58] Field of Search ............... 526/240, 241; 521/149, 521/153

[56] References Cited

U.S. PATENT DOCUMENTS

| 3,379,702 | 4/1968 | Spivey | 526/240 |
|---|---|---|---|
| 3,489,700 | 1/1970 | Kanai et al. | 528/88 |
| 3,513,112 | 5/1970 | Kanai et al. | 521/149 |
| 3,553,160 | 1/1971 | Schroeder et al. | 526/240 |
| 3,627,711 | 12/1971 | Schroeder et al. | 521/149 |
| 3,673,129 | 6/1972 | Sagne et al. | 521/149 |
| 3,708,444 | 1/1973 | Ganzler et al. | 521/88 |
| 3,726,812 | 4/1973 | Higashimura et al. | 526/240 |
| 3,734,870 | 5/1973 | Schroeder et al. | 521/149 |

Primary Examiner—Morton Foelak
Attorney, Agent, or Firm—Curtis, Morris & Safford

[57] ABSTRACT

What is disclosed is a foamable polymer composition comprising
(A) a copolymer of 20–99.99 percent by weight of a member selected from the group consisting of acrylic acid and methacrylic acid, 0–79.99 percent by weight of a further ethylenically unsaturated monomer copolymerizable therewith, and 0.01–5 percent by weight of a member selected from the group consisting of metal salts of acrylic acid and methacrylic acid, and
(B) a foaming agent compatible with said copolymer, methods for making such a composition, polymer foams prepared therefrom, and laminates of such foams with resin-impregnated fiber glass mats.

8 Claims, No Drawings

FOAMABLE POLYMER MATERIAL

The present invention relates to a foamable material comprising a foaming agent and a copolymer containing certain metal salt comonomers, which material is converted on heating into a foam having a polyacrylimide or polymethacrylimide structure, and also relates to a method for making this material.

Polyimide foams are known as technical products and are described, for example, in British Pat. Nos. 1,078,425 and 1,045,229 and in German Pat. No. 1,817,156. They are prepared at foaming temperatures of 170° to 250° C. from polymers of acrylic acid or methacrylic acid, or from copolymers thereof with the nitriles or amides of these acids, which contain a foaming agent. During the foaming process, the starting material is converted into a polymer extensively composed of cyclic acrylimide or methacrylimide units. Ammonia, released by the decomposition of a foaming agent such as urea of formamide, can also be involved in this chemical conversion. The materials added as foaming agents may, thus, play a three-fold role. In addition to their principal function, which is to deliver the amounts of gas required for blowing up the polymer on heating, they can also serve as sources of ammonia for the completion of the conversion into polyimides. Finally, some of the materials used as foaming agents, for example formamides, homogenize the polymer—an essential requirement for a uniform foaming of the polymer in every direction in space.

Because of the mutual dependence of these effects on the amount of foaming agent, it is not possible to achieve a certain degree of foaming merely by adjusting the amount of foaming agent. It is relatively simple to reduce the density of the foam significantly by the additional use of foaming agents which are inert to imide formation, such as formic acid. However, it is difficult to produce high density foams by limiting the amount of foaming agent. But just these high density foams are particularly desired for many uses because of their high mechanical strength. There is a definite minimum amount of ammonia-forming foaming agent, which minimum amount is dependent on the polymer composition, below which conversion into polyimides is incomplete. In other cases, the use of small amounts of foaming agents results in inhomogenous polymers which warp or contort on foaming, as can be seen from the following Table.

Foamable polymers comprising 40 parts by weight of methacrylonitrile, 60 parts by weight of methacrylic acid, and differing amounts of formamide; plates 2 cm thick; foaming temperature = 215° C.

| Amount of Formamide (g per 100 g of monomer) | Density (kg/m³) | Condition after Foaming at 215° C. |
|---|---|---|
| 6 | 40 | uniform foam slab |
| 4 | 58 | uniform foam slab |
| 2.25 | 79 | strongly warped foam slab |

The simplest way to prepare foams of differing density is by varying the foaming temperature. Namely, density is greater the lower the foaming temperature. In order to assure the most complete possible imide formation despite a lower foaming temperature, foaming time must be increased. In this way, however, the capacity of the foaming apparatus is reduced. Further, the foams which are prepared at high foaming temperatures are superior in their mechanical properties and in their resistance to deformation by heat to those foams which are prepared at a lower temperature.

The limits to the influence of foam temperature on density are evident from the following Table, which relates to tests on a polymer comprising 28 parts by weight of methacrylonitrile, 65 parts by weight of methacrylic acid, and 8 parts by weight of formamide.

| Foam temperature (°C.) | Density (kg/m³) |
|---|---|
| 220 | 30 |
| 180 | 60 |
| 170 | 80 |
| 150 | no foam |

The present invention has as its object the preparation of a polymer material which can be converted to a polyimide foam of relatively high density by heating at a high foaming temperature without reducing the amount of foaming agent beneath that quantity which is necessary for maintaining homogeneity on polymerization or which is necessary for producing the amount of ammonia required for imide formation.

According to the invention, such a foamable polymer material comprises (A) a copolymer comprising 20 to 99.99 percent by weight of a member selected from the group consisting of acrylic acid and methacrylic acid, 0 to 79.99 percent by weight of one or more further ethylenically unsaturated monomers copolymerizable therewith, and 0.01 to 5 percent by weight of a salt component discussed below, and (B) a foaming agent which is compatible with said copolymer Copolymer (A) further comprises as a component from 0.01 to 5 percent, by weight thereof, of a metal salt of acrylic acid and/or methacrylic acid. Suitable metal salts include the acrylates and methacrylates of $Mg^{2+}$, $Zr^{4+}$, $Cr^{3+}$, $Co^{2+}$, $Zn^{2+}$, $Cd^{2+}$, $Bi^{3+}$, $TiO^{2+}$, and/or $Pb^{2+}$. Salts of $Mg^{2+}$, $TiO^{2+}$, $Zr^{4+}$, $Cr^{3+}$, and $Zn^{2+}$ are particularly preferred.

The effect of these metal salts can be explained as involving a reversible ionic cross-linking. This leads to gel formation at an early stage of the polymerization and in this way hinders demixing processes during the polymerization. For this reason along, smaller amounts of foaming agent can be used than are necessary, in the absence of metal salt addition, just for homogenization. Alternatively, foaming agents which have no homogenizing effect, such as urea, can be used. Further, the reversible cross-linking inhibits the foaming process so that by using metal salts either foams of a higher density are formed using the same amount of foaming agent and the same foaming temperatures or, at elevated foaming temperatures, foams of the same density but having improved properties are formed, in each case in comparison with products which are free of metal salts.

At temperatures between 170° C. and 250° C. the polymers are converted into foams having densities which can be set in the region from about 30 kg/m³ to 600 kg/m³ by the kind and amount of metal salt additive. Even densities of up to 900 kg/m³ could be prepared. However, typical foam properties are lost at such high densities.

The invention permits the preparation of foams having different densities at the same foam temperature and foaming time solely by varying the amount of metal salt. In this way, for example, the technically most important foams having densities from 30 to 200 kg/m³ can be prepared at a uniform foam temperature of 220° to 240° C. to have optimum mechanical properties.

The influence of the addition of chromium methacrylate on the density of foams which are prepared from foamable polymers comprising 28 parts by weight of methacrylonitrile, 65 parts by weight of methacrylic acid, and 8 parts by weight of formamide, heated to 190° C. or 220° C., are evident from the following Table.

| Content of Chrom- | Density (kg/m³) | |
| --- | --- | --- |
| methacrylate (mMol/100 ml) | Foamed for 2 hours at 190° C. | Foamed for 2 hours at 220° C. |
| 0 | 60 | 30 |
| 1 | 80 | 40 |
| 2 | 90 | 50 |
| 5 | 110 | 60 |
| 10 | 115 | 70 |

Foams having a resistance to deformation by heat up to 250° C. can be prepared from the polymers according to the present invention. Thus, a polymer of methacrylic acid and methacrylonitrile containing chromium methacrylate as the metal salt and tert.-butanol as the foaming agent can be expanded at 220° C. to a foam having a density of 134 g/l and a resistance to deformation by heat of 243° C.–250° C. A similar polymer employing propanol-2 as the foaming agent gave at 240° C. a foam having a density of 94 g/l and a resistance to deformation by heat of 220° C. In contrast, polymers which are free of metal salts can be foamed to comparable high densities only at temperature of at most 170° to 180° C. The resistance to deformation by heat of these foams is only 185° C. to 190° C. as a result of the low foaming temperature, i.e. of the incomplete transformation into polymethacrylimide.

The salts contained in the polymer material according to the present invention need not be added as such in the preparation of a foamable material. Rather, they can be formed in the mixture to be polymerized, before or during polymerization, from the acrylic acid or methacrylic acid which is contained therein and from another salt or another compound of the chosen metal. For example, the metals can be added in the form of their oxides, hydroxides, carbonates, acetates, formiates, or acetylacetonates, provided that these compounds dissolve sufficiently rapidly.

It is known in the art to use metal salts of methacrylic acid to improve optical clarity and to avoid warping on heating when preparing bulk polymers of methacrylic acid and methacrylonitrile without a foaming agent and converting the polymers by heating to 150° C. to 250° C. into non-foamed resins of high softening point. It could not be deduced from this that a foamable material of similar polymer composition and containing a foaming agent would permit the preparation of foams of high density.

In forming the polymers, acrylonitrile and/or methacrylonitrile are employed in addition to at least 20 percent by weight of acrylic acid and/or methacrylic acid, in which case the preferred ratio of the mols of acid:nitrile is between 2:3 and 3:2. Further comonomers which can be present in the composition of the polymer are acrylamide and methacrylamide and the lower alkyl esters of acrylic acid or methacrylic acid (having 1-4 carbon atoms in the alkyl portion).

As foaming agents for the preparation of imide foams, urea, dimethylurea, formamide, monomethylformamide, formic acid, and aliphatic alcohols having 3–8 carbon atoms are suitable, for example. Water can also be used alone as a foaming agent or, in combination with other foaming agents, also as an homogenizing additive. They are incorporated into the polymer during preparation in amounts from about 2 to 10 percent by weight. As already mentioned, merely the amount of foaming agent cannot be altered for controlling density because the simultaneous foaming process and imidization process are dependent in manifold ways on the kind and amount of the foaming gas which is developed. If the nitrogen content of the polymer is not sufficient for imide formation to the desired degree, then foaming agents having an amide structure and which cleave ammonia on heating are employed exclusively or predominantly.

The preparation of the foamable polymer material takes place in known fashion by a bulk polymerization in which a mixture of monomers, foaming agents, the metal salts according to the invention (or their precursors), and, further optional additives is polymerized under the influence of a free radical-forming initiator, preferably at temperatures from 50° C. to 120° C. The polymerization is suitably carried out in layers 1 to 3 cm thick which are expanded to correspondingly thicker foam slabs. As free radical formers, dibenzoyl peroxide, tert.-butyl perpivalate, or azo-bis-isobutyronitrile, are suitable, for example.

Since resistance to compression and other mechanical properties increase together with foam density, in part even over-proportionately, the foams prepared according to the present invention have good mechanical properties corresponding to their higher density. They are particularly suitable for the preparation of high-quality light construction elements or of sandwich elements having high load strength and stiffness.

The foams prepared according to the invention are more suitable for the manufacture of laminated materials with so-called prepregs than are all other types of foam material heretofore known. By the term "prepregs" is to be understood (cf. DIN 61850) glass-fiber mats in sheet form, impregnated with a duroplast resin, which can be formed at elevated temperatures under pressure and can be hardened without further additives. These mats contain unsaturated polyesters or epoxy resins as the duroplast resin. Usually, the fibre-reinforced resin forms a layer of 0.5 to 5 mm thickness. As reinforcing fibres they preferably contain mineral fibres, especially glass fibres or, for highly stressed laminates, carbon fibres. Synthetic fibres such as polyamide or polyester fibres or combinations of different fibres are in use, too. A more detailed description of appropriate fibres is given by P. H. Selden, "Glasfaserverstärkte Kunststoffe" (Springer-Verlag, Berlin 1967), pages 159–289. The fibres may be randomly distributed within the resin. Preferably, they form bundles, webs, or tissues. The main part of the fibres may be oriented in one direction to meet high mechanical stress.

Generally the fibres comprise from 20 to 80 percent by weight of the reinforced resin material, the lower range from 20 to 50 percent being used for general technical applications whereas the upper range from 50 to 80 percent is preferably employed in aircraft construction.

The remaining part of the reinforced material consists of a thermosetting resin, curable without further additives at elevated temperature. Thermosetting resins of this kind, such as unsaturated polyester or epoxide resins, are well known in the art and are described in detail by P. H. Selden (cited above, pages 5 to 82). For hardening, either high temperatures and high pressures with low press-times, or high temperatures and long press-times at low pressures, or long press-times and high pressures at moderate temperatures are necessary. Conventional polymethacrylamide foams cannot match these requirements in any way. On removal of the applied pressure, the foam springs back and the shaped piece bulges out. In contrast, the polymethacrylimide foams prepared according to the present invention give flawless shaped pieces if they are combined with pre-pregs under the following conditions:

| Foam Density (k/gm$^3$) | Prepreg Resin | Hardening Temp. (°C.) | Pressing Time (min.) | Pressure (N/mm$^2$) |
|---|---|---|---|---|
| 95 | Unsat. Polyester | 145 | 3 | 1.5 |
| 110 | Epoxide | 120 | 60 | 1.3 |
| 110 | Epoxide | 125 | 30 | 0.3 |
|  |  | 175 | 60 | 0.3 |

A better understanding of the present invention and of its many advantages will be had by referring to the following specific Examples, given by way of illustration.

EXAMPLE 1–17

100 ml of an equimolar mixture of methacrylic acid and methacrylonitrile were combined with 10 ml of propanol-2 as a foaming agent. In each case, 0.003 to 0.01 mol of a corresponding metal salt (see Table I) was combined with these solutions. After the addition of 0.1 percent by weight of tert.-butyl perpivalate and 0.05 percent by weight of dibenzoyl peroxide, the mixtures were polymerized in sealed evacuated ampules at 50° C. After 24 hours, the material was post-polymerized for 1 hour at 60° to 100° C. and for 1 hour at 100° C. Foaming took place during 2 hours at 200° C. or 2 hours at 220° C.

Table I

| Example | Metal Salt Cation | Metal Salt Anion | Concentration (Mol/100 g of monomer) | Density after foaming at 200° C. (g/l) | Density after foaming at 220° C. (g/l) |
|---|---|---|---|---|---|
| 1 | Mg$^{2+}$ | meth | 0.011 | — | 35 |
| 2 | Al$^{3+}$ | acac | 0.009 | — | 110 |
| 3 | K$^+$ | meth | 0.011 | — | 110 |
| 4 | TiO$^{2+}$ | acac | 0.01 | — | 160 |
| 5 | Cr$^{3+}$ | meth | 0.011 | — | 87 |
| 6 | Mn$^{2+}$ | acetate | 0.011 | 190 | — |
| 7 | Mn$^{3+}$ | acac | 0.011 | 25 | — |
| 8 | Co$^{2+}$ | acetate | 0.011 | 80 | 31 |
| 9 | Cu$^{2+}$ | acac | 0.003 | 50 | 25 |
| 10 | Zn$^{2+}$ | meth | 0.007 | — | 35 |
| 11 | Zr$^{4+}$ | acac | 0.011 | 620 | 210 |
| 12 | Cd$^{2+}$ | meth | 0.011 | 230 | 28 |
| 13 | Sn$^{4+}$ | acetate | 0.011 | 35 | 18 |
| 14 | Ce$^{3+}$ | meth | 0.011 | 75 | 75 |
| 15 | Pb$^{2+}$ | acetate | 0.011 | 170 | 25 |
| 16 | Pb$^{4+}$ | acetate | 0.009 | 75 | 42 |

Table I-continued

| Example | Metal Salt Cation | Metal Salt Anion | Concentration (Mol/100 g of monomer) | Density after foaming at 200° C. (g/l) | Density after foaming at 220° C. (g/l) |
|---|---|---|---|---|---|
| 17 | Bi$^{3+}$ | acetate | 0.003 | — | 20 |

Key:
meth = methacrylate
acac = acetylacetonate
Sn$^{4+}$ acetate = tributyl tin acetate

EXAMPLES 18–27

The procedure was similar to that of Examples 1–17 except that 8 ml of tert.-butanol and 2 ml of water were employed as the foaming agent.

Table II

| Example | Metal Salt Cation | Metal Salt Anion | Concentration (Mol/100 g of monomer) | Density after foaming at 200° C. (g/l) | Density after foaming at 220° C. (g/l) |
|---|---|---|---|---|---|
| 18 | — | — | — | 85 | 36 |
| 19 | Mg$^{2+}$ | meth | 0.011 | — | 60 |
| 20 | K$^+$ | meth | 0.011 | 200 | 47 |
| 21 | TiO$^{2+}$ | acac | 0.01 | 260 | 100 |
| 22 | Cr$^{3+}$ | meth | 0.011 | 250 | 97 |
| 23 | Co$^{2+}$ | acetate | 0.011 | — | 38 |
| 24 | Zn$^{2+}$ | meth | 0.011 | — | 55 |
| 25 | Zr$^{4+}$ | acac | 0.011 | 170 | 67 |
| 26 | Cd$^{2+}$ | meth | 0.011 | 155 | 47 |
| 27 | Bi$^{3+}$ | acetate | 0.0014 | — | 45 |

Key:
meth = methacrylate
acac = acetylcetonate

EXAMPLE 28

A mixture of 1300 ml of methacrylic acid, 1300 ml of methacrylonitrile, 65 g of chromium-III-dimethacrylatehydroxide, 208 ml of tert.-butanol, and 52 ml of water was combined with 0.1 percent by weight of tert.-butyl perpivalate and 0.05 percent by weight of dibenzoyl peroxide and polymerized in a glass chamber in a layer thickness of 1 cm at 45° C. for 48 hours.

Subsequently, the material was post-polymerized for two hours at 50° C. to 100° C. and for two hours at 100° C. The material was foamed for two hours at 220° C.
Density = 134 kg/m$^3$
Resistance to compression = 5.0 N/mm$^2$
Resistance to deformation by heat = 246° C.
Water uptake (in distilled H$_2$O at 23° C.) = 16.6% by weight after 7 days For comparison, values are given below for a commercially available polymer (foamed with formamide at 175° to 180° C.).
Density: 130 kg/m$^3$
Resistance to compression = 3.8–4.1 N/mm$^2$
Resistance to deformation by heat = 185° C.
Water up-take = 43% by weight after seven days.

EXAMPLES 29–32

Chromium-dimethacrylate-hydroxide was added in amounts from 0.001 mol to 0.01 mol to 100 ml portions of a monomer mixture of 28 parts by weight of methacrylonitrile, 65 parts by weight of methacrylic acid, 8 parts by weight of formamide, 0.1 part by weight of tert.-butyl perpivalate, and 0.05 parts by weight of dibenzoyl peroxide. The mixtures were polymerized in sealed glass ampules at 42° C. After a two-hour long post-polymerization at 100° C., the samples were foamed for two hours at 190° C. or for two hours at 220° C.

| Examples | Chromium Content (mol/100 g of monomer) | Density after foaming at 190° C. (g/l) | Density after foaming at 220° C. (g/l) |
| --- | --- | --- | --- |
| 29 | 0.001 | 80 | 40 |
| 30 | 0.002 | 90 | 50 |
| 31 | 0.005 | 100 | 60 |
| 32 | 0.011 | 115 | 70 |

EXAMPLE 33

100 ml of a mixture of 67 parts by weight of methacrylonitrile, 43 parts by weight of methacrylic acid, and 36 parts by weight of acrylic acid, together with 0.75 part by weight of chromium-(III)-dimethacrylate-hydroxide, 0.15 part by weight of tert.-butyl perpivalate, and 0.075 part by weight of dibenzoyl peroxide are mixed with 7 ml of isopropanol and 3 ml of tert.-butanol and polymerized as in Example 32. Heating the polymer to 220° C. (two hours) gives a foam having a density of 20 g/l.

EXAMPLE 34

A mixture of 70 parts by weight of methacrylic acid, 30 parts by weight of methacrylonitrile, 11 parts of weight of N-methylformamide, 0.5 part by weight of chromium-(III)-dimethacrylate-hydroxide, 0.1 part by weight of tert.-butyl perpivalate, and 0.05 part by weight of benzoyl peroxide is polymerized as in Example 32. Heating of the polymer for two hours at 200° C. gave a foam having a density of 40 g/l.

EXAMPLE 35

86 parts by weight of methacrylic acid, 53 parts by weight of acrylonitrile, 3.6 parts by weight of zinc-(II)-methacrylate, 9.5 parts by weight of isopropanol, 3 parts by weight of water, 0.12 part by weight of tert.-butyl perpivalate, and 0.06 part by weight of benzoyl peroxide are mixed and polymerized as in Example 32. Heating of the polymer for two hours at 200° C. gives a foam having a density of 60 g/l.

EXAMPLE 36

42 parts by weight of acrylonitrile, 58 parts by weight of acrylic acid, 34 parts by weight of methacrylamide, 7 parts by weight of urea, 0.02 parts by weight of chromium-(III)-dimethacrylate-hydroxide, and 0.3 part by weight of dibenzoylperoxide are mixed, polymerized for 72 hours at 50° C., and subsequently tempered for two hours at 100° C. Heating for two hours at 200° C. gave a foam having a density of 20 g/l.

EXAMPLE 37

56 parts by weight of methacrylic acid, 44 parts by weight of methacrylonitrile, 3 parts by weight of water, 0.26 part by weight of zinc acetylacetonate, 0.1 part by weight of tert.-butyl perpivalate, and 0.05 part by weight of dibenzoyl peroxide were polymerized at 50° C. for 48 hours and subsequently tempered for two hours at 100° C., for two hours at 150° C., and for one hour at 180° C. Heating for 30 minutes at 220° C. gave a foam having a density of 85 g/l.

EXAMPLE 38

A mixture of 50 parts by weight of acrylamide, 50 parts by weight of methacrylic acid, 11 parts by weight of methyl methacrylate, 0.02 part by weight of chromium-(III)-dimethacrylate-hydroxide, 5 parts by weight of urea, and 0.2 part by weight of azo-isobutyric acid-dinitrile is polymerized at 50° C. for 48 hours and subsequently tempered for two hours at 100° C.

Two hours' heating at 220°-240° C. of a granulate prepared from the polymer so obtained gives a foam with a density of 200 g/l.

Properties:
Resistance to deformation by heat = 248° C.
Tensile strength = 11.7 kg/cm$^2$
Resistance to bending = 26 kg/cm$^2$
Impact strength = 0.3 cm kg/cm$^2$
Notch impact strength = 0.3 cm kg/cm$^2$.

EXAMPLE 39

38.4 parts by weight of methacrylic acid, 25.6 parts by weight of methacrylonitrile, 10 parts by weight of methyl methacrylate, 10 parts by weight of 85% phosphoric acid, 10 parts by weight of tris-(2,3-dibromo-propyl)phosphate, 2.5 parts by weight of chromium-(III)-dimethacrylate-hydroxide, 5 parts by weight of formic acid, 1 part by weight of maleic acid anhydride, 0.1 part by weight of tert.-butyl perpivalate, and 0.05 part by weight of benzoyl peroxide are mixed and filtered. The filtrate is polymerized for 48 hours at 50° C. and subsequently for two hours at 100° C. Heating of the polymer for two hours at 190° C. gave a difficulty-flammable foam with a density of 50 g/l.

Following Examples 40–42 relate to the preparation of laminates with prepregs.

EXAMPLE 40

The surfaces of a 300 mm × 200 mm rectangle, 8 mm in thickness, of the foam prepared in Example 31 are covered with cut pieces of a prepreg comprising an unsaturated polyester resin (commercially available from Menzolit, "Type SPP 30 R") and the combination is introduced into a 2-piece steel tool having a surface temperature of 145° C. The tool is closed with the aid of an hydraulic press. The specific pressure is 1.5 N/mm$^2$. After three minutes the press is opened and the shaped piece, coated with glass fiber-reinforced synthetic resin, is taken out hot and cooled to room temperature. The shaped piece is free of distortion, free of portions assuming the shape of the original form, has a smooth surface, and is of a thickness which corresponds to the cavity of the tool.

EXAMPLE 41

Both sides of a 300 mm × 300 mm rectangle, 8 mm thick, of the foam prepared in Example 32 are covered with a prepreg having an epoxy resin structure (commercially available from Ciba-Geigy, "Fibredux 916 G") and the combination is pressed between heated press plates at a temperature of 120° C. at a specific pressure of 1.3 N/mm$^2$. After a hardening time of one hour, the bonded core is removed hot. The material did not buckle under the press conditions.

EXAMPLE 42

Both sides of a 300 mm × 300 mm rectangle, 8 mm thick, of the foam prepared in Example 32 having a density of 110 kg/m$^3$ are covered with an epoxy resin prepreg capable of withstanding high temperatures (Ciba-Geigy "Fibredux 918 G"). The material is hardened between hot press plates in a hardening cycle of 30 minutes at 125° C. and 60 minutes at 175° C. under a pressure of 0.3 N/mm². The bonded core is removed hot from the press and cooled to room temperature. The core undergoes no buckling under the press conditions.

What is claimed is:

1. A foamable polymer composition comprising
   (A) a copolymer of 20–99.99 percent by weight of a member selected from the group consisting of acrylic acid and methacrylic acid, 0–79.99 percent by weight of a further ethylenically unsaturated monomer copolymerizable therewith, and 0.01–5 percent by weight of a member selected from the group consisting of metal salts of acrylic acid and methacrylic acid, and
   (B) a foaming agent compatible with said copolymer.

2. A composition as in claim 1 wherein said copolymer comprises a member selected from the group consisting of acrylonitrile and methacrylonitrile as said further monomer.

3. A composition as in claim 2 wherein the ratio of the moles of acrylic acid and methacrylic acid present in said copolymer to the moles of acrylonitrile and methacrylonitrile therein is between 2:3 and 3:2.

4. A composition as in claim 1 wherein said foaming agent is selected from the group consisting of formamide, a monoalkylformamide, formic acid, water, and primary aliphatic monoalcohols having 3 to 8 carbon atoms.

5. A composition as in claim 1 wherein said salt is a member selected from the group consisting of acrylic acid salts and methacrylic acid salts of $Mg^{2+}$, $Zr^{4+}$, $Cr^{3+}$, $Co^{2+}$, $Zn^{2+}$, $Cd^{2+}$, $Bi^{3+}$, $TiO^{2+}$, and $Pb^{2+}$.

6. The method of making a composition as in claim 1 which comprises free-radically copolymerizing a monomer mixture containing 20–99.99 percent by weight of a member selected from the group consisting of acrylic acid and methacrylic acid, 0–79.99 percent by weight of a further ethylenically unsaturated monomer copolymerizable therewith, and 0.01–5 percent by weight of a member selected from the group consisting of metal salts of acrylic acid and methacrylic acid, in the presence of a foaming agent compatible with the copolymer so formed.

7. A method as in claim 6 wherein said metal salt is formed in said monomer mixture before or during polymerization by reaction of acrylic acid and methacrylic acid with a metal compound other than the acrylate or methacrylate salt or the metal.

8. A method as in claim 7 wherein said metal compound is an acetate or acetylacetonate of the metal.

* * * * *